March 15, 1932. J. McK. BALLOU 1,849,652
AIRPLANE
Filed March 3, 1931
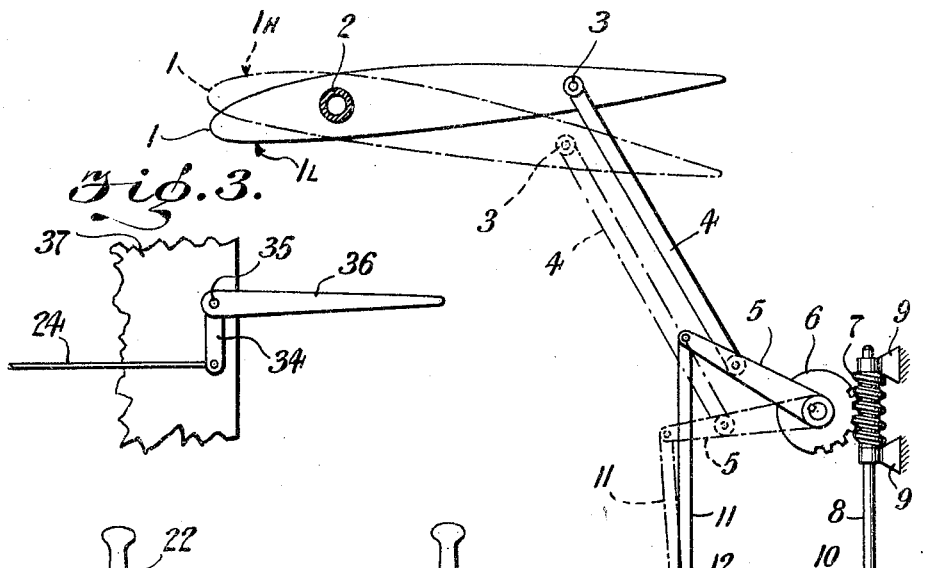
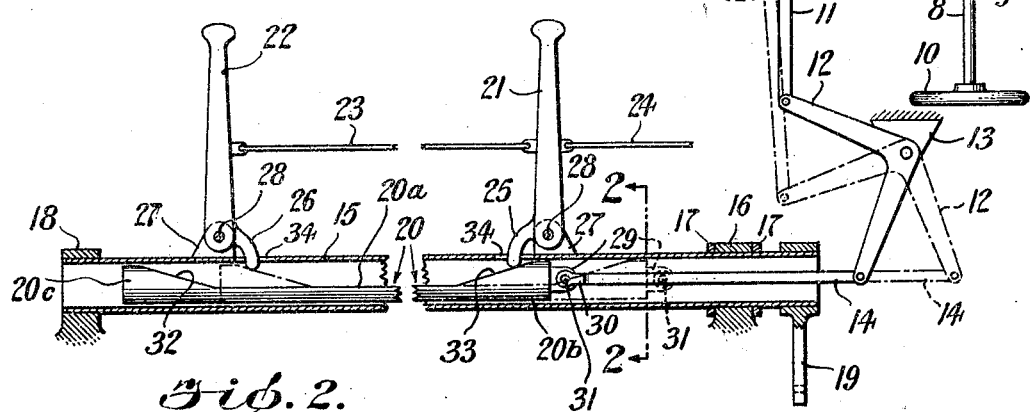
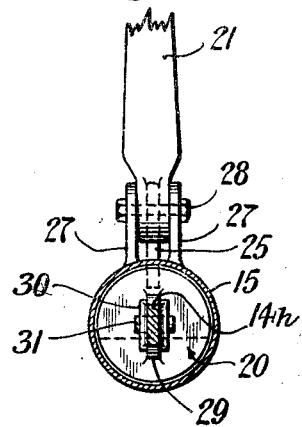
INVENTOR
John McK. Ballou
BY Moakley and Gill
ATTORNEYS Patented Mar. 15, 1932

1,849,652

UNITED STATES PATENT OFFICE

JOHN McK. BALLOU, OF FOREST HILLS, NEW YORK, ASSIGNOR TO MERRILL AIRCRAFT COMPANY, OF DOVER, DELAWARE, A CORPORATION OF DELAWARE

AIRPLANE

Application filed March 3, 1931. Serial No. 519,722.

This invention relates to airplanes and more particularly to airplanes wherein longitudinal control is secured by angular adjustments between the wings and the fuselage.

In airplanes of this class, in order to secure the full advantage of this angular movement, its range approaches the angle of zero lift, as well as the stalling angle of the supporting surface. It is desirable to have elevators present for emergency use, or for certain maneuvers, but if these elevators are unrestricted, the pilot, inadvertently or even willfully might use them, when the wing control is set for an extreme position, to put the airplane into a dangerous attitude, such as a stall or dive. The present invention, while allowing unrestricted use of the elevator when the airplane is in its intermediate condition, such as cruising, still limits the use of the elevator to safe movements when the airplane is in its extreme positions of low angle or maximum speed, and high angle or minimum speed.

An object of this invention is to provide a mechanical stop in the manual control system such that when the wing adjustment is set for the maximum high angle, the pilot is unable to further increase the angle of attack by the use of his elevator.

Another object is to provide a mechanical stop in the manual control system such that when the wing adjustment is set for the minimum low angle, the pilot is unable to further decrease the angle of attack by the use of his elevator.

Another object is to graduate the amount of restriction in said stops in proportion to the proximity of the wings to their high and low angle position, while leaving the manual control means unrestricted while the wings are in their intermediate positions of adjustment.

Other objects will appear from the ensuing description of the drawings, wherein

Fig. 1 is a vertical elevation in part section of the essential elements for an embodiment of this invention, Fig. 2 is a fragmentary cross-section along lines 2—2 of Fig. 1, and Fig. 3 is a view of a portion of the tail of the airplane showing the elevator.

In Fig. 1, two positions of adjustment of the wing 1, and consequently of certain of the other elements of this invention are shown, as will develop in the further description of the drawings. The wing 1 is shown in its extreme low angle of attack setting in full outline 1L, and also in its extreme high angle of attack setting in broken outline, 1H. Throughout, elements shown in broken outline are to be understood to be in their positions corresponding to the adjustment for extreme high angle of attack of the wing 1H.

Referring to the full line arrangement, a wing system 1 is pivoted about an axis 2, suitably mounted in the airplane, parallel to the span of the wing system 1, and swingably secured at a point 3 to a link 4, operated by a crank 5 and by a toothed wheel 6, the teeth cut only in a portion to limit the throw of the crank 5 in either direction, meshing with a worm 7, hung in bearings 9, 9, suitably mounted at a proper location in the airplane structure, and driven through shaft 8 by hand wheel 10 at the discretion of the pilot. Also articulated on crank 5, is link 11, the other end of which is jointed to bell crank 12, hung in bearing bracket 13, suitably secured to the airplane structure. The motions imparted to bell crank 12 appear as corresponding movements of link 14 and eventually as movements of sliding block 20, comprising the portions, 20a, cut away for unrestricted operation of sticks 21 and 22, and end portions 20b and 20c, which have inclined surfaces 32 and 33. This movement is accomplished through the interposition of forked end 30, (see Fig. 2) of link 14, pin 31, and lug 29 of sliding block 20. Sliding block 20 is adapted to slide in the bore of the control column hollow shaft 15, riding in bearings 16, 18, suitably mounted in the airplane structure, and restrained against axial movements by thrust collars 17, 17. At a convenient location on shaft 15, a crank 19 is secured, from which motion is taken off to operate the roll control mechanism and surfaces, by any suitable or well known method. Joy sticks 21, 22 or their equivalent, such as Deperdussin wheels, impart angular deflections, through shaft 15 to crank 19 at the discretion of the pilot, by the well known hand motions, and thereby to the roll control means. Fore and aft movements of the sticks 21, 22 or their equivalent, such as Deperdussin yokes, impart movements of the pilot's hand to the rigid link 24, and in any suitable or well known manner to the elevator, as for example that shown in Fig. 3, where link 24 operates horn 34, and thereby elevator 36, hinged in a suitable manner at 35 to the framework of the tail 37. A push-pull rod 23 is shown as coordinating the movements of rear pilots stick 21 with front pilots stick 22 for controlling the elevator.

The sticks 21, 22 are swung about bolts 28, 28, mounted in lugs 27, 27, integral with shaft 15, as is clearly shown in Fig. 2. Projections 25 and 26 are provided on sticks 21 and 22 respectively, adapted to enter holes 34, 34 in shaft 15. Projection 25 is shown in contact with inclined surface 33 of sliding block 20. Thus, it is evident that when the wing 1 is in its extreme low angle position of adjustment 1L, projection 25 and inclined surface 33 act as a stop to prevent forward movements of stick 21, and, through the interposition of rod 23 to also prevent forward movements of stick 22. It is well known to those skilled in the art that forward movements of the stick induce diving rotations of the airplane. Thus, it is clear that the ability of the pilot to dive the airplane from the extreme low angle setting of the wings is limited or prevented by this construction. Likewise, when the wing 1 is in its high angle condition 1H, as produced by a setting of hand wheel 10, transmitted through worm 7, wheel 6, crank 5, link 4 and pivot 3, in a manner similar to that described above for the low angle adjustment, link 11 is also moved as shown, moving sliding block 20 through bell crank 12 and link 14, shown all in broken lines. This brings inclined surface 32 into position to contact with projection 26 on stick 22, preventing or limiting rearward movements of the sticks 21 and 22, and limiting the ability of the pilot to stall the airplane from the extreme high angle position of the wing 1H. By the surfaces 32 and 33 being properly inclined it is possible in any design to graduate the amount of limiting of the elevator control as the extreme high and low angles are approached, to any extent desired. In the extreme position of high or low angle, this limiting appears to its most extreme extent, and in the intermediate position it is removed, allowing full normal angular deflection of the elevators as in well known conventional designs.

While certain preferred embodiments of the invention have been disclosed it will be understood that it may be embodied in other forms and that various changes in structural details may be made without departing from the principle of the invention as defined in the appended claims.

I claim:

1. In an airplane of the adjustable wing class and having an elevator, a mechanism for adjusting the angular position of the wings, means for operating the elevator, adjustable stops for the means, and means for coordinating the adjustment of the wings with the adjustment of said stops.

2. An airplane control system comprising wings rotatably mounted on a cross axis, a mechanism for adjustably rotating said wings, an elevator, means for operating said elevator, adjustable stops for said means, and means for coordinating the adjustment of said stops with said wing mechanism.

3. In an airplane control system, adjustable wings, elevators, a mechanism for adjusting the wings, a means for moving the elevators with adjustable stops therefor, and means for coordinating the adjustment of said stops with said wing adjusting mechanism.

4. In an airplane control system, an adjustable wing, an elevator, mechanism for adjusting the wing, means for moving the elevator with an adjustable stop therefor, and means for co-ordinating the adjustments of said stop with said wing adjusting mechanism.

In testimony whereof I affix my signature.

JOHN McK. BALLOU.